ANTENNA SYSTEM WHICH SUPPLEMENTS THAT OF PORTABLE RADIO INSIDE AUTOMOBILE

Filed June 8, 1955

INVENTOR

HAROLD TOWNSEND,

BY Larson and Whitney

ATTORNEYS 2,790,899
Patented Apr. 30, 1957

2,790,899

ANTENNA SYSTEM WHICH SUPPLEMENTS THAT OF PORTABLE RADIO INSIDE AUTOMOBILE

Harold O. Townsend, Bayshore, N. Y., assignor, by mesne assignments, to Stromberg-Carlson Company, Rochester, N. Y. (a division of General Dynamics Corporation, a corporation of Delaware)

Application June 8, 1955, Serial No. 513,935

1 Claim. (Cl. 250—20)

This invention relates to an antenna system and more particularly to a method and apparatus whereby the strength of a signal received by a radio receiving instrument may be substantially increased.

In connection with the use of small portable radio receivers and specifically with pocket receivers such as disclosed in Patent Re. 23,651 the signal received may be greatly attenuated due to the fact that the receiver is located in a shielded area or is beyond the range of clear reception. Obviously, the size of the antenna used with such receivers is dictated by considerations of convenience and for this reason it is not possible to provide such receivers with an antenna of sufficient size to bring in a strong signal in a comparatively weak signal area. Thus, there was a very real limitation placed on the use of such receivers since, for example, they could not be used effectively within a shielded locale such as an automobile.

Radio receivers such as disclosed in the above-mentioned patent and other receiving instruments are used for radiopaging service. Each subscriber is assigned a code number or tone signal, and when the office of that subscriber wants him, that subscriber's selective code or signal is transmitted over the air to alert him. Each subscriber carries a receiving instrument in his pocket. A large portion of the subscriber's time may be spent in an automobile and it can be readily appreciated that the automobile will shield the pocket radio receiving instrument to such an extent as to attenuate the signal transmitted by the paging service. Thus, the problem has been to provide some means for strengthening the signal received when in a weak signal area without in any way encumbering the pocket receiving instrument.

The present invention provides a method and apparatus for accomplishing the desired result. There is provided a circuit which may be connected with an automobile antenna or other large antenna and means is provided whereby the strength of the signal adjacent the receiver may be increased to the signal strength at the large antenna. This strengthened signal is received by the portable receiving instrument by inductive coupling through the wave pervious case of the receiver. The circuit comprises a tuner including a resonant circuit with a coil in the output of the tuner. The tuner is tuned to the desired frequency and the pocket receiving instrument is placed adjacent the coil in the output of the tuner. Thus, when the tuner is connected to a large antenna which is located outside of the weak signal area or is of sufficient size to bring in a strong signal, the receiver will receive this strong signal by inductive coupling.

A primary object of the present invention is to provide a method and apparatus for increasing the signal received by a portable radio receiving instrument.

Another object of the present invention is to provide a circuit including a tuner having a coil in the output thereof whereby when the tuner is connected to a large antenna and a radio receiving instrument is placed adjacent the coil the strength of the signal received by the receiving instrument is increased.

Other objects and many of the attendant advantages of the present invention will become apparent upon consideration of the following detailed specification taken in connection with the accompanying drawing wherein.

Figures 1, 2:
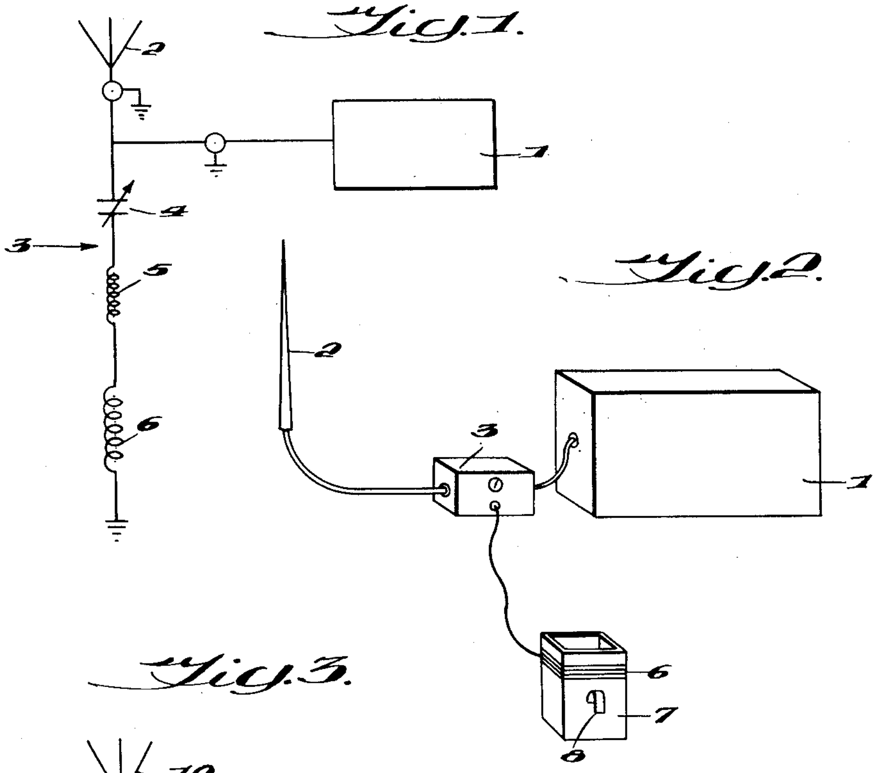
Fig. 1 is a circuit diagram of one form of the invention.
Fig. 2 is a diagrammatic showing of the components according to the circuit of Fig. 1.

Referring now specifically to the drawing wherein like numerals indicate like parts throughout the several views, there is shown at 1 in Fig. 1 a radio receiver having an antenna 2. The receiver 1 may be, for example, located within a shielded area such as in an automobile with the antenna 2 located outside the automobile. In order to increase the signal received by a portable receiver (not shown) which is located in the same area as the receiver 1, there is provided a tuner 3 comprising a resonant circuit having a variable condenser 4 and inductance coil 5. While a series circuit is disclosed, it is readily apparent that a parallel tuned circuit could be used with equal effect. Connected to the output of the tuner is a coil 6. This coil 6 may be wound around the outside of an open ended casing 7 as shown in Fig. 2. The casing 7 may be made of plastic or any other suitable wave pervious material and the coil 6 may, if desired, be embedded within the casing body. The tuner 3 is provided with a suitable dial and means to set the variable condenser 4 so that the circuit will resonate at the desired frequency. The portable receiver having a wave pervious casing may be placed within the open ended casing 7 and, if desired, a hook 8 mounted on the casing may be used to attach the casing to a part of the automobile or building within which the receiver is located. The signal strength within the casing 7 will be the same as at the antenna 2 which is outside the weak signal area and the radio receiver will receive in its internal antenna coil the signal from the coil 6 by virtue of inductive coupling between these coils. Since radio paging services are normally conducted at 30 to 50 mc. s. as compared to the frequency band of normal broadcasting, .6 to 1.6 mc. s., there will be no interference between the two receivers.

Figure 3:
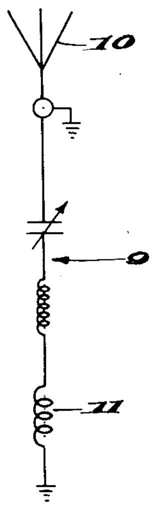
Fig. 3 is a circuit diagram of a modified form of the invention.
Figure 4:
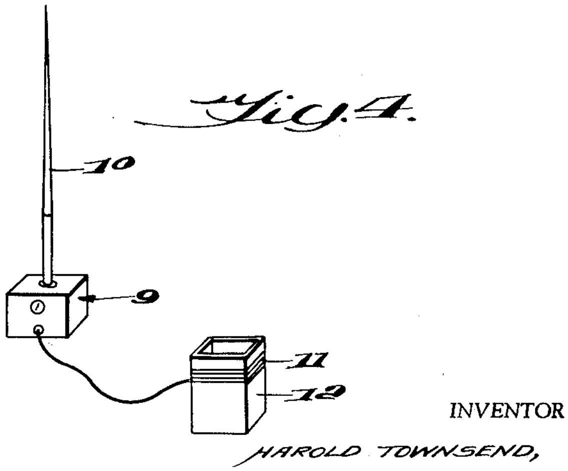
Fig. 4 is a diagrammatic view of the components in accordance with the circuit of Fig. 3.

As shown in Figs. 3 and 4 there is provided a tuner 9 which may be provided with a telescoping antenna 10 mounted thereon. The tuner 9 has an output coil 11 which is wound around a casing 12 similar to the casing 7 described above. By the use of such an equipment the effective signal area of the radio paging services may be increased from ten miles to thirty miles. It can also be seen that a tuner such as disclosed in Figs. 3 and 4 which is provided with a self-contained telescoping antenna may be also used with an automobile antenna or the like.

It can be seen that by virtue of the present invention a simple yet effective method and apparatus for increasing the strength of a signal receiver by a portable radio receiving instrument is provided. The present invention in no way encumbers the receiving instrument into which it may be readily inserted or withdrawn.

Obviously, many modifications and variations of the present invention are possible in the light of the above teachings without departing from the spirit of the invention as defined in the appended claim.

What is claimed as new and desired to be secured by Letters Patent is:

An antenna system for a pocket type fixed frequency radio receiver having a wave pervious casing comprising an antenna of a vehicle radio receiver, a casing having one end thereof open, said casing and said pocket radio receiver having a 1 to 1 size relationship so that said receiver fits snugly within said casing and is supported thereby, said casing being made of wave pervious material and having a coil wrapped thereon, said coil being connected with an inductance and a variable condenser to form a series resonant circuit, said series resonant circuit connected to said antenna and adapted to resonate at the fixed frequency of said receiver whereby the strength of the signal received by the radio receiver is increased through the inductive coupling.

References Cited in the file of this patent

UNITED STATES PATENTS

| | | |
|---|---|---|
| 1,931,236 | Nicholson | Oct. 17, 1933 |
| 1,985,241 | Daya | Dec. 25, 1934 |
| 2,138,894 | Ware | Dec. 6, 1938 |
| 2,203,442 | Pressley | June 4, 1940 |
| 2,262,956 | Newbold | Nov. 18, 1941 |
| 2,407,417 | Halstead | Sept. 10, 1946 |
| 2,483,815 | Easton | Oct. 4, 1949 |
| 2,494,451 | Olson | Jan. 10, 1950 |
| 2,567,431 | Halstead | Sept. 11, 1951 |
| 2,569,687 | Pan | Oct. 2, 1951 |
| 2,582,277 | Pawlison | Jan. 15, 1952 |